US006308391B1

(12) United States Patent
Blaimschein et al.

(10) Patent No.: US 6,308,391 B1
(45) Date of Patent: Oct. 30, 2001

(54) METHOD PRODUCING V-SHAPED GROOVES

(75) Inventors: Gottfried Blaimschein, Steyr; Franz Heidlmayer, St. Marien, both of (AT)

(73) Assignee: GFM Beteiligungs- und Management GmbH & Co. KG, Steyr (AT)

( * ) Notice: Subject to any disclaimer, the term of this patent is extended or adjusted under 35 U.S.C. 154(b) by 0 days.

(21) Appl. No.: 09/452,995

(22) Filed: Dec. 2, 1999

(30) Foreign Application Priority Data

Dec. 3, 1998 (DE) .............................................. 198 55 803

(51) Int. Cl.[7] ...................................................... B23P 17/00
(52) U.S. Cl. ................................................ 29/412; 83/875
(58) Field of Search ................................ 29/407.07, 412, 29/417, 707, 709, 714; 83/875

(56) References Cited

U.S. PATENT DOCUMENTS 4,083,390 * 4/1978 Ingham ............................ 144/136 R
4,524,894 * 6/1985 Leblond ................................ 83/875
4,732,183 * 3/1988 Barnes ................................ 144/357
4,791,970 * 12/1988 Walser et al. ........................ 144/213
5,400,843 * 3/1995 Gonner et al. ........................ 144/3 P
5,786,266 * 7/1998 Boruta .................................... 83/875

FOREIGN PATENT DOCUMENTS

4205390 * 8/1993 (DE) .
10000282 * 1/1998 (JP) .
818261 * 1/1998 (FR) .

* cited by examiner

*Primary Examiner*—David P. Bryant
*Assistant Examiner*—Jermie E. Cozart
(74) *Attorney, Agent, or Firm*—Collard & Roe, P.C.

(57) ABSTRACT

To produce a chamfer or a keyway on a workpiece, the workpiece is machined with a longitudinal feed following the course of the chamfer or groove. To obtain a clean chamfer or groove in an economic way, machining is effected by a peeling operation by means of a peeling knife, whose broadside forming a cutting edge is aligned transverse to the feed direction during the longitudinal feed, and which is guided parallel to the workpiece surface with a certain cutting depth.

3 Claims, 3 Drawing Sheets

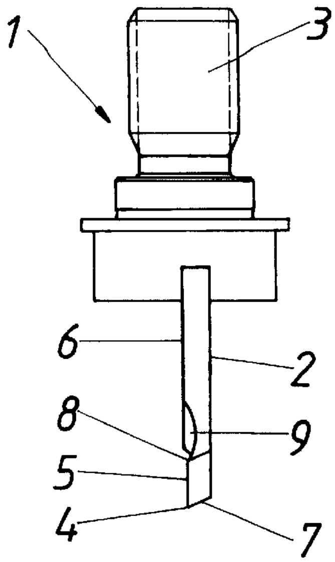
FIG.2
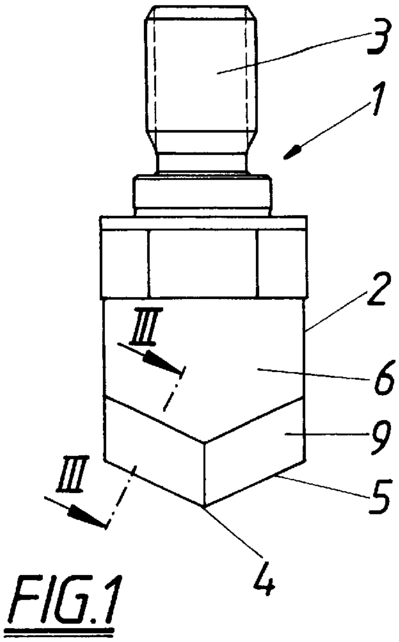
FIG.1
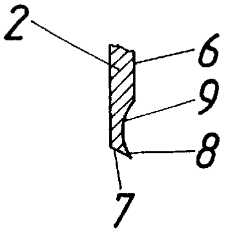
FIG.3
FIG.4a
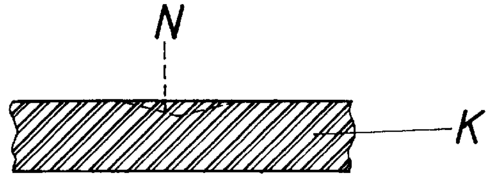
FIG.4b
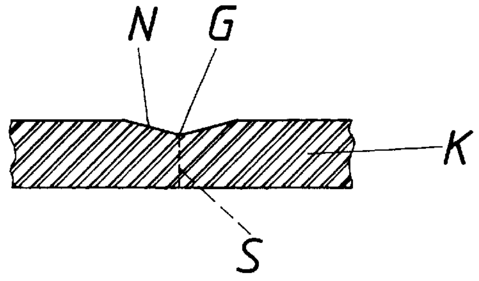
FIG.4c
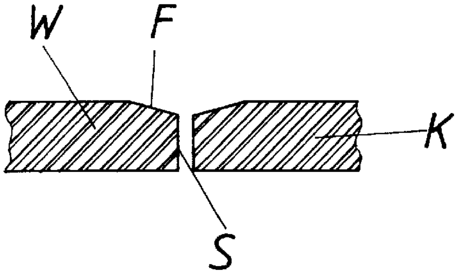

METHOD PRODUCING V-SHAPED GROOVES

FIELD OF THE INVENTION

This invention relates to a method of producing a chamfer or a keyway on a workpiece, according to which the workpiece is machined with a longitudinal feed following the course of the chamfer or groove, and to a tool for performing this method.

DESCRIPTION OF THE PRIOR ART

Machining workpiece edges to produce chamfers has so far mostly been effected by a milling operation by means of special milling cutters, which, however, involves an undesired formation of dust and a considerable amount of chips produced, and in addition only simple contours can be chamfered by means of milling. Moreover, milling cannot be performed to a certain relative cutting depth with respect to the workpiece surface, so that considerable manufacturing tolerances depending on the thickness of the material must be accepted.

Moreover, chamfering by a cutting operation by means of inclined knives or disk knives is also already known, which cutting operation requires relatively complex cutting machines.

It is therefore the object underlying the invention to provide a method as described above, which allows an economic chamfering of workpieces of an easily machinable material, in particular plastics, and leads to a perfect machining quality within close tolerances. There should also be created an expedient tool for performing this method

SUMMARY OF THE INVENTION

This object is solved by the invention in that machining is effected by a peeling operation by means of a peeling knife, whose broadside forming a cutting edge is aligned transverse to the feed direction during the longitudinal feed, and which is guided with a certain cutting depth parallel to the workpiece surface. To maintain a certain cutting depth, the peeling knife is preferably guided along the workpiece surface via a sliding block, or to maintain a certain cutting depth of the peeling knife, the distance between a reference point firmly provided on the peeling knife and the workpiece surface can preferably be measured in a contactless way by means of a laser or ultrasonic sensor and be used for adjusting the height of the peeling knife.

The peeling operation results in a clean progressive cut with a peeling depth independent of the thickness of the material, which can appropriately be maintained, in particular by means of the sliding block resting on the workpiece surface and the precise adjustment of the peeling knife with respect to this sliding block, or by controlling the height of the peeling knife in dependence on the measurement of the distance between the reference point and the workpiece surface. Peeling also produces a continuous chip without formation of dust, which chip is easy to dispose of, and apart from the actual chamfering of workpiece edges it is likewise possible to cut keyways into the workpiece surface, which allows to design surfaces with special optical effects. Since the peeling knife is rotatable about its axis and is oriented in accordance with the respective feed direction, all kinds of workpiece edges or contours can be chamfered without having to fear an impairment of the machining quality When the peeling knife is subjected to a vibration during the peeling operation, in particular to a vibration with an ultrasonic frequency, the cutting force is reduced and higher cutting speeds can be achieved with an increased quality of the cut. In addition, the occurrence of built-up edges is prevented by a vibration superimposed on the cutting operation.

For chamfering the edges of a workpiece cut out from a starting material, the edges of the workpieces already cut have so far been milled off, which further increases the required effort. In accordance with the invention, a keyway with flanks corresponding to the chamfer is now peeled into the starting material by following the contour of the workpiece, and the workpiece is cut out from the starting material along the groove bottom, so that due to the keyway the edges of both parts to be separated from each other are chamfered at the same time, and by prechamfering the entire workpiece contour there can also be achieved an extremely precise and convenient manufacture of workpieces. Peeling the keyway and cutting through the material can be performed in successive steps, but also simultaneously in a single machining step.

When chamfered portions having the same contours are cut out from two different starting materials, and the same are alternately inserted into the recesses of the respective other starting material, which were produced by such cutting, there is obtained a special application of the inventive method for producing special floor covering plates or marquetry and the like, which provide particular decorative effects by incorporating the correspondingly different cutouts in their recesses, where at the same rime workpieces having laterally reversed patterns are produced, so to speak.

A peeling knife substantially comprises a blade which has a cutting edge opposite a holding attachment. To be able to properly perform the inventive method with such peeling knife, the blade has a sweptback cutting edge converging to a central tip, where the cutting edge is oriented towards a broadside of the blade, the front side, and is formed between and end-face flank and a face verging into a chip recess on the broadside. By means of such blade, a keyway is peeled out of the workpiece surface, which for chamfering a workpiece is subsequently separated along the groove bottom by a separating cut and thus forms the respective chamfers for the separate workpiece parts. When using the one or the other edge portion of the sweptback cutting edge, the marginal edge of a workpiece already cut out might also be chamfered directly, and here as well the angle of the chamfer depends on the shape of the sweptback cutting edge.

When the blade has an additional cutting edge aligned normal to the front side, which additional cutting edge is formed by a rear central web of the blade and freely protrudes in an axial extension of the tip of the sweptback cutting edge, a separating cut can be performed together with the peeling cut, whereby chamfering and cutting out a workpiece are effected in one step.

BRIEF DESCRIPTION OF THE DRAWING

In the drawing, the subject-matter of the invention is illustrated by way of example, wherein:

FIGS. 1 and 2 show an inventive peeling knife in a front view and in a side view, respectively, FIG. 3 shows a cross-section along line III—III of FIG. 1, FIGS. 4*a* to *c* illustrate the chamfering of a workpiece edge in accordance with the inventive method by means of three working steps, each in a cross-section through the workpiece, as well as FIGS. 5 and 6 show another embodiment of an inventive peeling knife in a front view and in a side view, respectively.

DESCRIPTION OF THE PREFERRED EMBODIMENT

Figure 6:
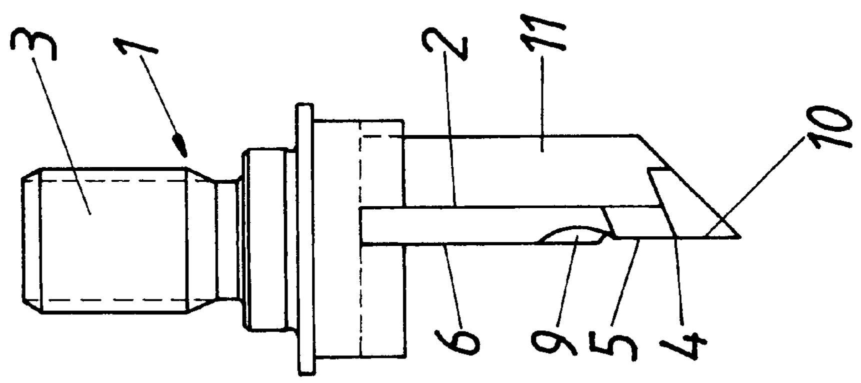

As is indicated in FIGS. 1 to 3, a peeling knife 1 for chamfering workpieces of an easily machinable material or for producing a keyway in the surface of such workpiece comprises a blade 2, which opposite a holding attachment 3 has a sweptback cutting edge 5 converging to a central tip 4. This cutting edge 5 is oriented towards a broadside 6 of the blade 2, i.e. the front side, and forms an end-face flank 7 as well as a face 8 verging into a chip recess 9 on the broadside.

To economically chamfer the edges of a workpiece cut out from a plastic material or the like by means of this peeling knife 1, a keyway N following the contour of the workpiece is first of all peeled into the plastic material K, as is indicated in FIGS. 4*a* to *c*, where the peeling knife 1 guided to the exact cutting depth is aligned transverse to the feed direction with it broadside 6 forming a cutting edge and is rotated about its vertical axis corresponding to the change in direction of the longitudinal feed. Upon peeling the keyway N, a separating cut S is drawn along the groove bottom G by means of a usual cutting knife, and from the plastic material K the workpiece W is cut out, which at its marginal edge now has a chamfer F corresponding to the groove flanks. Since in this way the marginal edge is chamfered also at the remaining piece of material, the next workpiece cut out from the plastic material K already has a chamfer in the vicinity of this edge of cut, whereby an economic production of such workpieces can be achieved.

Figure 5:
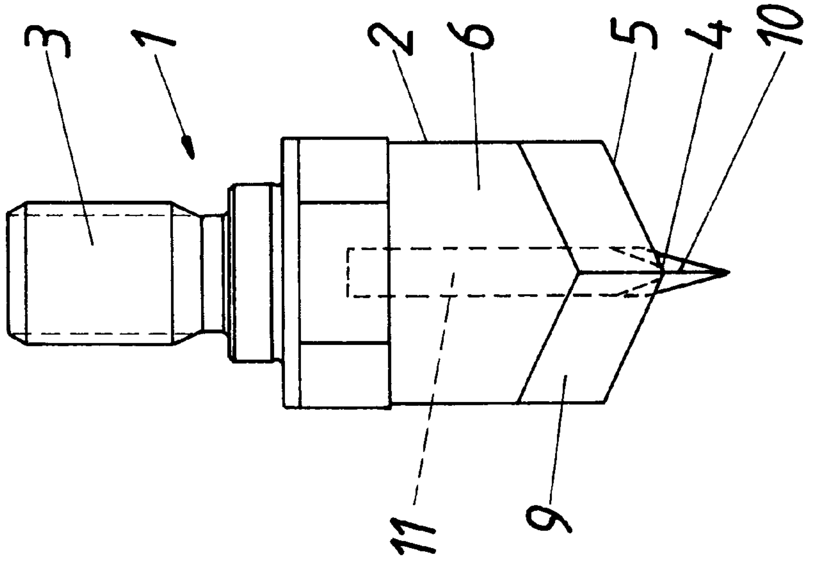

In accordance with the embodiment shown in FIGS. 5 and 6, the blade 2 can also be equipped with an additional cutting edge 10 aligned normal to the front side 6, which additional cutting edge is formed by a central web 11 at the rear side of the blade 2 and freely protrudes in an axial extension of the tip 4 of the cutting edge 5, so that together with peeling the keyway there is also effected the separating cut for cutting through the plastic material, and cutting out and chamfering the workpiece are performed in a single machining step.

Figure 8:
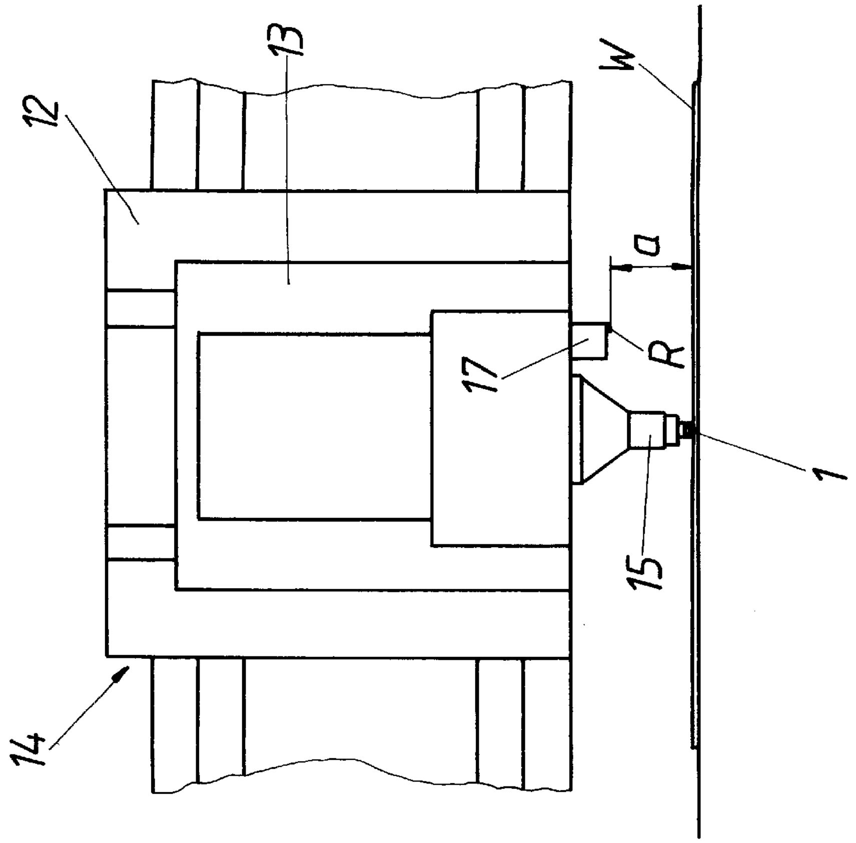
FIGS. 7 and 8 show two examples of a machine tool including an inventive peeling knife, each with reference to a partly cut-out front view of the tool carriage.
Figure 7:
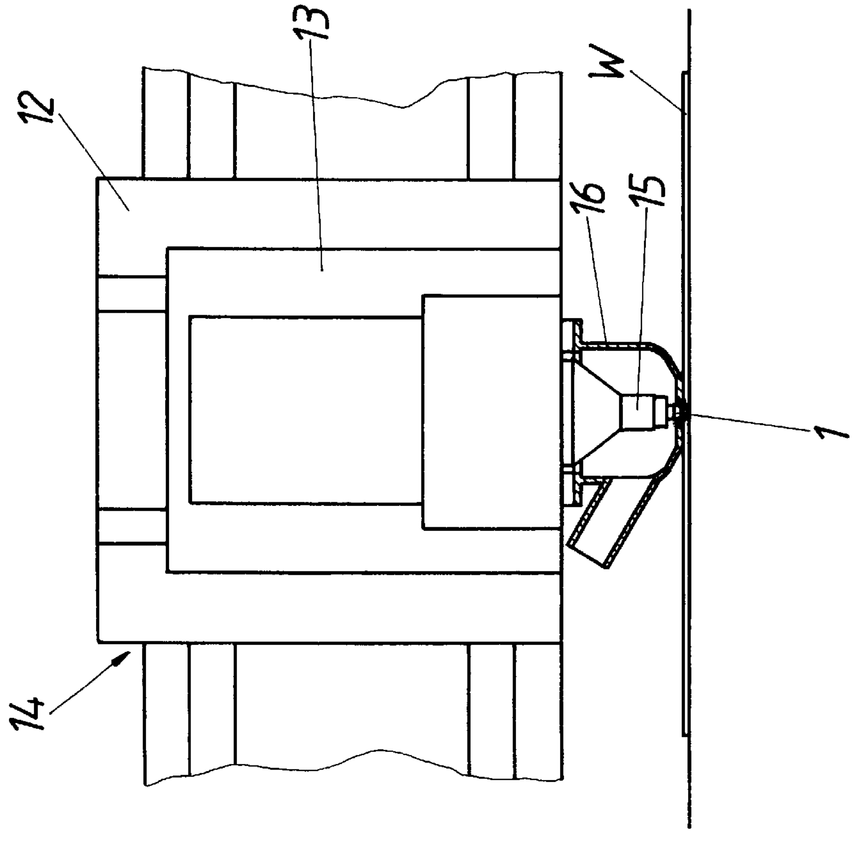

As is indicated in FIGS. 7 and 8, a usual machine tool not represented in detail is employed for using the peeling knife 1, which machine tool has a tool carriage composed of a horizontal carriage 12 and a vertical carriage 13, where the holding attachment of the peeling knife 1 is clamped into the tool holder 15 of the vertical carriage 13.

To be able to guide the peeling knife 1 corresponding to the feed with a predetermined cutting depth parallel to the surface of the workpiece W. there is provided a sliding block 16 resting on the workpiece as shown in FIG. 7, with respect to which the position of the peeling knife 1 has been adjusted, and which therefore always ensures a uniform cutting depth during the peeling operation.

As shown in FIG. 8, a contactless sensor 17, for instance a laser or ultrasonic sensor, is provided to maintain the predetermined cutting depth, by means of which the distance a between the workpiece surface and a reference point R firmly provided on the peeling knife, mostly the sensor itself, is measured, and which is used to adjust the height of the peeling knife by a corresponding drive control of the vertical carriage 13.

What is claimed is:

1. A method of producing V-shaped grooves machined in the surfaces of different materials of a workpiece having outer contours, the V-shaped grooves having a predetermined depth relative to the surface, which comprises the steps of advancing a peeling knife in a feed direction along the surfaces, the peeling knife having a broad side forming a V-shaped cutting edge penetrating the surfaces to the predetermined depth, machining the V-shaped grooves with the cutting edge while aligning the cutting edge transversely to the feed direction as the peeling knife is advanced, cutting the outer contours of the workpieces along bottoms of the V-shaped grooves after the grooves have been machined with the peeling knife to produce parts of the workpieces of the same outer contour, and arranging said parts of different materials in an alternating pattern.

2. A method of producing a V-shaped groove in the surface of a workpiece having an outer contour, the V-shaped groove having a predetermined depth relative to the surface, which comprises the steps of advancing a peeling knife in a feed direction along the surface, the peeling knife having a broad side forming a V-shaped cutting edge penetrating the surface to the predetermined depth, machining the V-shaped groove with the cutting edge while aligning the cutting edge transversely to the feed direction as the peeling knife is advanced, and cutting the outer contour of the workpiece along a bottom of the V-shaped groove with a cutting knife at the same time that the V-shaped groove is machined with the peeling knife.

3. A method of producing V-shaped grooves machined in the surfaces of different materials of a workpiece having outer contours, the V-shaped grooves having a predetermined depth relative to the surface, which comprises the steps of advancing a peeling knife in a feed direction along the surfaces, the peeling knife having a broad side forming a V-shaped cutting edge penetrating the surfaces to the predetermined depth, machining the V-shaped grooves with the cutting edge while aligning the cutting edge transversely to the feed direction as the peeling knife is advanced, cutting the outer contours of the workpieces along bottoms of the V-shaped grooves with a cutting knife at the same time that the V-shaped grooves have been machined with the peeling knife to produce parts of the workpieces of the same outer contour, and arranging said parts of different materials in an alternating pattern.

* * * * *